Figure 1:
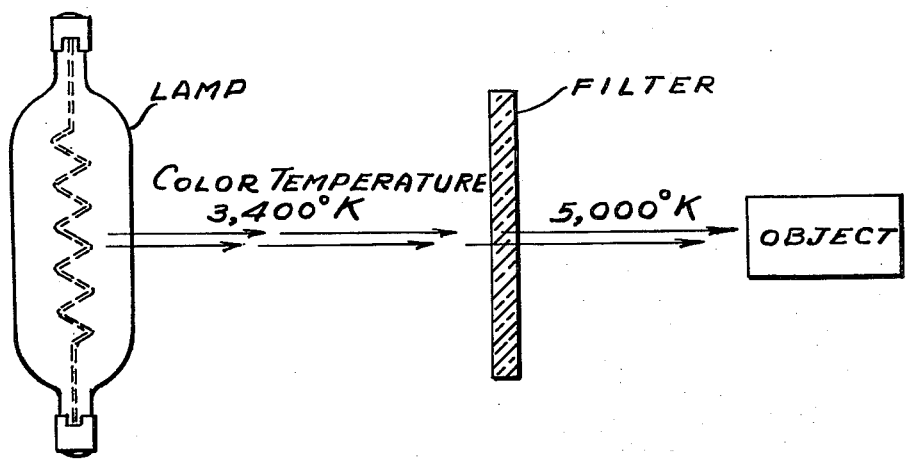

United States Patent Office 3,188,218
Patented June 8, 1965

3,188,218
LIGHT FILTER
Thomas H. Elmer and John P. Hoxie, Corning, N.Y., assignors to Corning Glass Works, Corning, N.Y., a corporation of New York
Filed Oct. 19, 1962, Ser. No. 231,789
8 Claims. (Cl. 106—52)

This invention relates to a heat-resistant glass light filter or absorbing screen, capable of modifying the color characteristics of artificial light from a high temperature incandescent lamp so as to produce a resultant illumination having color characteristics approximately equivalent to daylight. In particular, this invention relates to a transparent, blue colored high silica glass filter which may be used to modify illumination from an artificial light source to render it compatible with daylight sensitive photographic films.

The photosensitive films used for daylight color photography are used to best advantage with daylight illumination characterized by a color temperature of approximately 5000° K. When daylight color film is used with uncorrected illumination from an artificial light source such as a tungsten filament lamp, poor color reproduction is obtained. The use of daylight type film may be extended to applications where only artificial light is available or where daylight is available in limited amounts and must be supplemented by artificial light sources by filtering or selectively transmitting the artificial light so as to correct the color temperature of the light to an apparent color temperature of about 5000° K. Such correction may be accomplished by means of filters placed over the lens of the camera. However, for convenience and in order to retain full efficiency of camera lenses, it has been found more desirable to render the light source compatible with the film by means of a color-correcting filter placed over the light source.

Recently, there has come into popular use for photographic illumination a new type of tungsten filament incandescent lamp. The inclusion of a small amount of iodine in this lamp results in a regenerative process in which evaporated tungsten is redeposited on the filament, thus allowing the lamp to be operated at higher temperatures than the tungsten filament lamps previously employed for photographic illumination. This lamp has found particular utility as a compact camera attachment lamp. The higher operating temperature of this iodine-tungsten lamp offers the advantage of a greater amount of illumination per watt of power consumed. The illumination from the iodine-tungsten lamp is characterized by a color temperature of approximately 3400° K., which must be corrected to an apparent color temperature of about 5000° K. if it is to be used to best advantage with daylight color film. It is desirable that a color-correcting filter for such purposes be mounted in close proximity to the iodine-tungsten lamp in order that the combination of lamp and color-correcting filter may not be unduly cumbersome. As a result, the filter must be sufficiently resistant to thermal shock and withstand the combination of high temperatures created by the lamp and ambient atmospheric conditions. Accordingly, it is advantageous to employ a glass consisting essentially of silica, such as fused quartz or a glass of the type known as 96% silica glass.

It is an object of this invention to provide a heat-resistant, color-corrective glass filter. Another object is to provide a method and means for correcting the color temperature of an iodine-tungsten lamp to approximately 5000° K. A further object is to provide a method and means of rendering the illumination produced by an iodine-tungsten lamp more compatible with daylight color film.

These and other objects are accomplished by means of the present invention which resides in a light filter for altering the apparent color temperature of a light source, the filter being composed of a high silica glass, preferably a 96% silica glass, containing as color-correcting additives, 0.04 to 0.1% $Co_2O_3$, 0.1 to 0.2% alkali metal oxides and 0.40 to 2.0% $P_2O_5$, on the basis of a 4.3 mm. thickness of the high silica glass and substantially uniformly distributed throughout. The invention further resides in a method of altering the apparent color temperature of illumination from a light source and to the combination of filter and light source.

Figure 2:
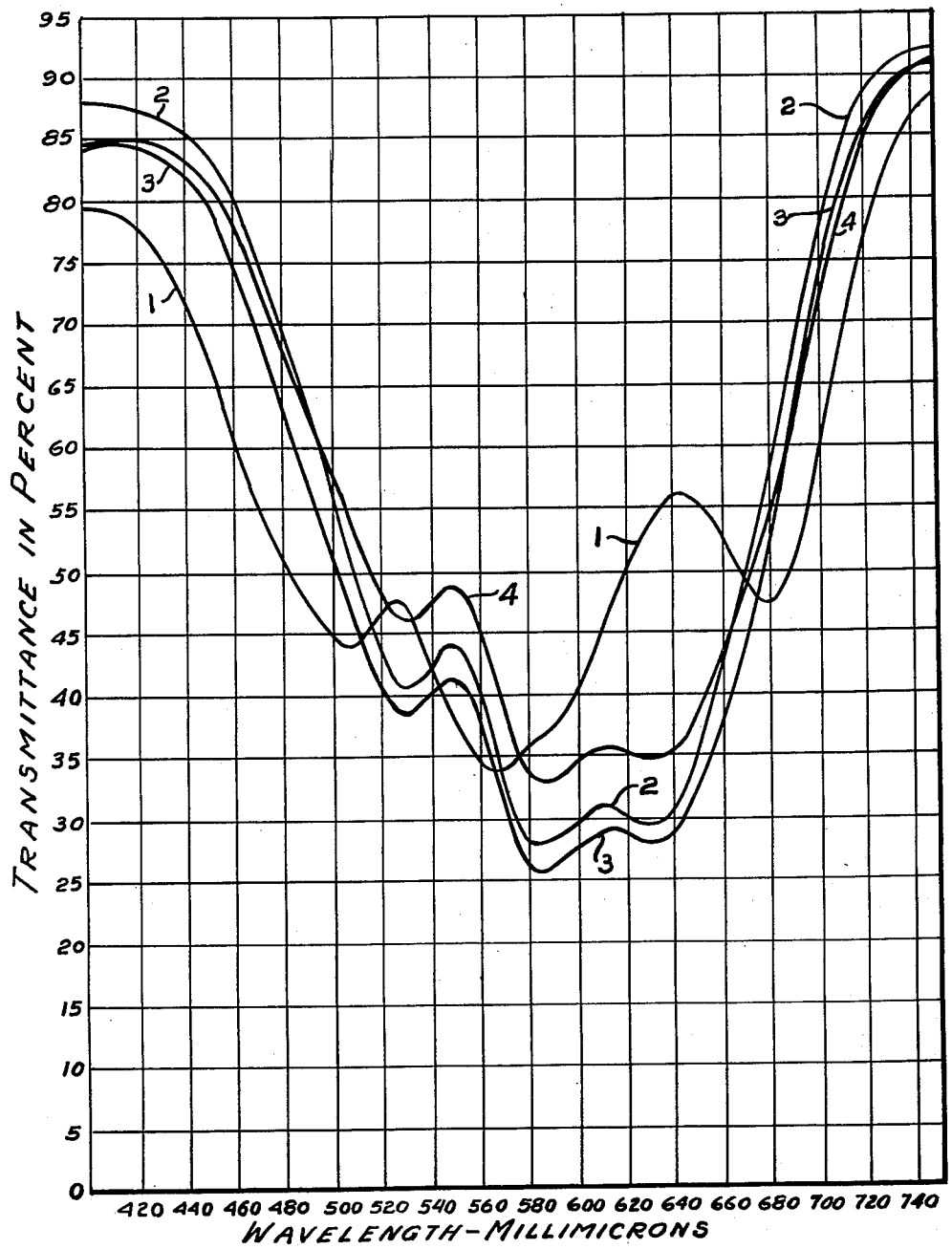

Determination of the spectral transmission of the filters of the present invention may be made with the aid of a spectrophotometer to obtain transmission curves of the type shown in FIG. 2. On the basis of such determinations, filters possessing the color-correcting properties acceptable for purposes of the present invention may be defined in terms of acceptable values at certain critical wavelengths. It has been determined that the desired color-correcting properties required of the filters of the present invention are obtained from a composition of high silica glass, preferably a 96% silica glass, containing as essential color-correcting additives, $Co_2O_3$, alkali metal oxide and $P_2O_5$, and providing a spectrophotometric analysis such that the transmission in terms of selected wavelengths may be defined as 61 to 69% at 480 m$\mu$ and 22 to 34% at 590 m$\mu$, the percent transmission at 480 m$\mu$ being at least double the percent transmission at 590 m$\mu$.

The thickness of the filters of the present invention may vary considerably, the critical factor being the total amount of color-correcting oxides in the path of illumination. Thicknesses between 3 and 6 mm. have been found satisfactory, filters of about 4 mm. thickness being used herein for illustration. Reasonable variations in thickness will not materially affect the color-correcting properties of the filter provided correspondingly corrective variations in oxide additives are made so that the actual amount of color-correcting oxides in the path of illumination remains substantially the same. Likewise, the additives may be restricted to a limited thickness within the filter, if desired, provided the distribution laterally is substantially uniform.

In a particular embodiment, the filters of the present invention are used to selectively transmit light from an iodine tungsten lamp, the color temperature of which approximates that of a black-body radiation at about 3400° K. The selective transmission of this light by the filters of the present invention results in the altering of the apparent color temperature of the transmitted light to about 5000° K. The color correction will vary somewhat, depending on the color temperature of the light source. For example, the same filter might be used to alter the apparent color temperature of an ordinary incandescent lamp, operating at about 2700° K. to an apparent color temperature of about 4000° K.

The color-correcting properties of the filters of the present invention are due to the presence of a combination of small but critical amounts of oxides of cobalt, phosphorous and an alkali metal. The presence of cobalt oxide alone as a colorant results in a filter having an undesirably high transmission in the "red" region of the spectrum, that is, at about 640 m$\mu$. For example, note curve 1 of FIG. 2. Such transmission gives a "pink" coloration which is undesirable for purposes of the present invention and will not transmit illumination with which daylight color film may be used to obtain a good quality of color reproduction. The addition of an appropriate amount of an alkali metal oxide minimizes the "pink" color by lowering the transmission in the "red" region of the spectrum. However, the presence of the alkali metal oxide also results in an undesirable lowering of transmission in the "blue" region of the spectrum that is at about 450 m$\mu$. The inclusion of an appropriate amount of phosphorous oxide greatly enhances the transmission in the "blue" region. The addition of alkali metal oxides is based on the use of an essentially alkali-free porous glass. In the event that a porous glass containing significant amounts of alkali metal oxides is used, the amount added may be adjusted accordingly, the color-correction properties of the glass being a function of the total amount of alkali metal oxides.

The use of 96% silica glass in the production of the filters of the present invention has been found desirable, not only because of its excellent thermal properties, but also because of the facility with which the color-correcting additives may be introduced into the glass, in controlled amounts, while the glass is in a porous state.

The introduction of the color-correcting oxide to a 96% silica glass may be accomplished by means of a leaching and impregnation technique in accordance with the procedures generally described in Patent No. 2,303,756. The procedure involves the production of a parent glass article in a conventional manner from a selected borosilicate glass. The article is then thermally treated to separate the glass into two phases, one of which is composed essentially of soluble constituents. The article is then leached with a dilute mineral acid, which removes the soluble phase and leaves a porous, high silica structure retaining its original shape. The porous, high silica structure is then rinsed and impregnated with a solution of the desired salts, dried and heat treated to convert the salts to oxides, close the pores and consolidate the glass.

The impregnation step may be accomplished by immersing the porous glass article in a 0.1 N HNO$_3$ solution containing the desired salts, either directly after rinsing, in the so-called "wet" impregnation, or after rinsing followed by drying, in the so-called "dry" impregnation. The immersion time may vary according to the concentration of salts in the solution, the greater the concentration of salts in the solution, the shorter the immersion time. The immersion time may also vary according to whether a "wet" or "dry" impregnation process is employed. If a "wet" impregnation is employed, a much greater immersion time must be allowed to obtain a given concentration of additives within the glass than is the case if a "dry" impregnation is employed. This is due to the fact that in a "wet" impregnation, the additives enter the pores by the slow process of diffusion, whereas in a "dry" impregnation, the additives are brought into the pores by means of capillary action. We prefer to employ the "wet" method, which, although slower, allows better control of the impregnation. However, either method may be employed.

In order to further describe the invention, reference is made to the accompanying drawings, wherein:

FIG. 1 is a schematic diagram of a method of correcting the apparent color temperature of illumination from an incandescent lamp. The "Lamp" included therein may be the above-mentioned iodine-tungsten lamp. Reference is made to an article entitled "An Iodine Incandescent Lamp With Virtually 100 Percent Lumen Maintenance," by E. G. Zubler and F. A. Mosby, in the Journal of the Illuminating Engineering Society, December 1959, for further details regarding such lamps. Illumination from the lamp has an apparent color temperature of about 3400° K., although this may vary somewhat with operating conditions and construction. In accordance with our invention, the "Filter" of FIG. 1 selectively transmits the illumination, thereby correcting the apparent color temperature by about 1600° K, that is, to about 5000° K.

FIG. 2 is a graphical illustration of the color transmission characteristics of filters of the present invention wherein color is indicated in terms of wavelengths. Curve No. 1 included for purposes of comparison, illustrates the color transmission characteristics of a filter wherein the cobalt salt is the only additive. Curves 2, 3 and 4 are transmission curves of filters of the present invention, the compositions of which may be found in Table I, below.

By way of further illustrating the invention and the manner in which it may be practiced, the following specific examples are set forth:

Table I

| Example | Impregnating Solution (grams per 100 ml. of 0.1 N HNO$_3$) | | |
| --- | --- | --- | --- |
| | Co(NO$_3$)$_2$·6H$_2$O | KNO$_3$ | Conc. H$_3$PO$_4$* |
| 1 | 1.5 | | |
| 2 | 1.0 | 1.25 | 10.0 |
| 3 | 1.2 | 1.25 | 7.5 |
| 4 | 1.0 | 1.25 | 7.5 |

* 85% H$_3$PO$_4$ solution.

In each case, the impregnation solution consisted of a 0.1 N HNO$_3$ solution to which cobalt and potassium salts and phosphoric acid were added in the amounts indicated. The porous glass was immersed for about 16 to 18 hours at room temperature. The 16 to 18 hour immersion time was chosen on the basis of convenience for an overnight impregnation process. After immersion, it was transferred into 0.1 N HNO$_3$ and held for about two minutes. The glass was then dipped several times in deionized water to rinse any residual coloring additives from the surface, blown free of water droplets and dried at room temperature.

The air dried glass was then heated to about 950° C. and held for about one hour, then heated to about 1250° C. and held for about 30 minutes. These thermal treatments convert the salts to their oxides, close the pores and consolidate the glass.

The correction of transmission in the "red" region of the spectrum may also be obtained with alkali metal salts other than potassium. By substitution of other alkali metal salts for the potassium in the examples above, it was determined that the efficiency of the alkali metal additives decreases in the following order: Cs, Rb, K, Na and Li. Based on a consideration of efficiency and economy, we prefer to use K salts. Mixtures of alkali metal salts may also be used.

The above examples are illustrative of the present invention and are not intended to be limitative thereof. Variations and modifications will be readily apparent to those skilled in the art. The required Co, alkali metal and P oxides may be incorporated in the glass by means of solutions containing salts other than those shown in the examples. For example, appropriate amounts of K$_2$HPO$_4$ may be substituted for the KNO$_3$ and H$_3$PO$_4$ shown.

Transmission characteristics of the filters corresponding to the examples of Table I are shown in FIG. 2. Curves 1, 2 and 3 of FIG. 1 correspond to the filters of Examples 1, 2 and 3, respectively, of Table I above. Each curve shows the percentage transmission for the corresponding filter at any selected wave-length of radiation, between 400 m$\mu$ and 750 m$\mu$. The data from which the curves were plotted were obtained from a G.E. Model No. 5962004G25, Recording Spectrophotometer.

As will be evident to those skilled in the art, many variations and modifications can be practiced within the scope of the present invention. For example, the heat-resistant blue filter of the present invention may be used as a protective enclosure for outdoor floodlights and the like, where thermal shock may result from rain, etc. falling on the hot lamp and where the color of the transmitted light may be desirable for its esthetic properties. Furthermore, it is within the scope of the present in-

What is claimed is:

1. A light transmitting filter formed from a high silica glass containing color-correcting additives consisting of $Co_2O_3$, an alkali-metal oxide, and $P_2O_5$ in amounts equivalent to between 0.04 and 0.1% by weight $Co_2O_3$, between 0.1 and 0.2% by weight alkali metal oxide and between 0.40 and 2.0% by weight $P_2O_5$, based on a uniformly impregnated high silica glass of 4.3 mm. thickness, said filter providing a spectral transmission curve wherein the present transmission in terms of selected wavelengths is 61 to 69% at 480 m$\mu$ and 22 to 34% at 590 m$\mu$ the percent transmission at 480 m$\mu$ being at least double the percent transmission at 590 m$\mu$.

2. A light filter in accordance with claim 1 wherein said high silica glass is 96% silica glass.

3. A light filter in accordance with claim 2 wherein said alkali metal oxide is potassium oxide.

4. A method of altering the apparent color temperature of an incandescent light source from about 3400° K. to about 5000° K. which comprises transmitting radiation from said light source through a selectively transmitting light filter formed from 96% silica glass containing as essential color-correcting additives, $Co_2O_3$, $K_2O$ and $P_2O_5$, said additivies being present in amounts equivalent to between 0.04 and 0.1% by weight $Co_2O_3$, between 0.1 and 0.2% by weight $K_2O$, and between 0.4 and 2.0% by weight $P_2O_5$ based on a uniformly impregnated 96% silica glass of 4.3 mm. thickness.

5. A light transmitting filter formed from 96% silica glass containing color-correcting addivities consisting of $Co_2O_3$, alkali metal oxide, and $P_2O_5$, said additives being present in amounts equivalent to between 0.04 and 0.1% by weight $Co_2O_3$, between 0.1 and 0.2% by weight alkali metal oxide and between 0.4 and 2.0% by weight $P_2O_5$ based on a uniformly impregnated high silica glass of about 4.3 mm. thickness.

6. A light filter in accordance with claim 5 wherein said alkali metal oxide is potassium oxide.

7. A light transmitting filter formed from a 96% silica glass containing color-correcting addivities consisting of $Co_2O_3$, an alkali metal oxide and $P_2O_5$ in proportions such that the filter is capable of altering the apparent color temperature of an incandescent light source from about 3400° K to about 5000° K.

8. A light transmitting filter in accordance with claim 7 wherein said additives are present in amounts equivalent to between 0.04 and 0.1% by weight $Co_2O_3$, between 0.1 and 0.2% by weight $K_2O$ and between 0.4 and 2.0% by weight $P_2O_5$, based on a uniformly impregnated 96% silica glass of 4.3 mm. thickness.

References Cited by the Examiner

UNITED STATES PATENTS

| | | | |
|---|---|---|---|
| 1,122,066 | 12/14 | Brady | 106—52 |
| 2,355,746 | 8/44 | Nordberg et al. | 106—52 |
| 3,093,319 | 6/63 | Gamain | 240—1.1 |

OTHER REFERENCES

Handbook of Chemistry & Physics, 43rd edition (1961); Chem. Rubber Publ. Co., Cleveland, Ohio (page 3057).

Morey: The Properties of Glass; pub. 1954, by Reinhold Pub. Co. of New York City (pages 454–456).

Weyl: "Coloured Glasses," pub. 1959, by Dawson's of Pall Mall, London (pages 179–187, 190 and 191).

TOBIAS E. LEVOW, *Primary Examiner.*